Feb. 3, 1970  E. V. MROZEK  3,493,133
DIPSTICK ASSEMBLY
Filed Nov. 15, 1967  5 Sheets-Sheet 1

Inventor:
Elmer V. Mrozek.
By Hume, Clement, Hume, & Lee.
Attys.

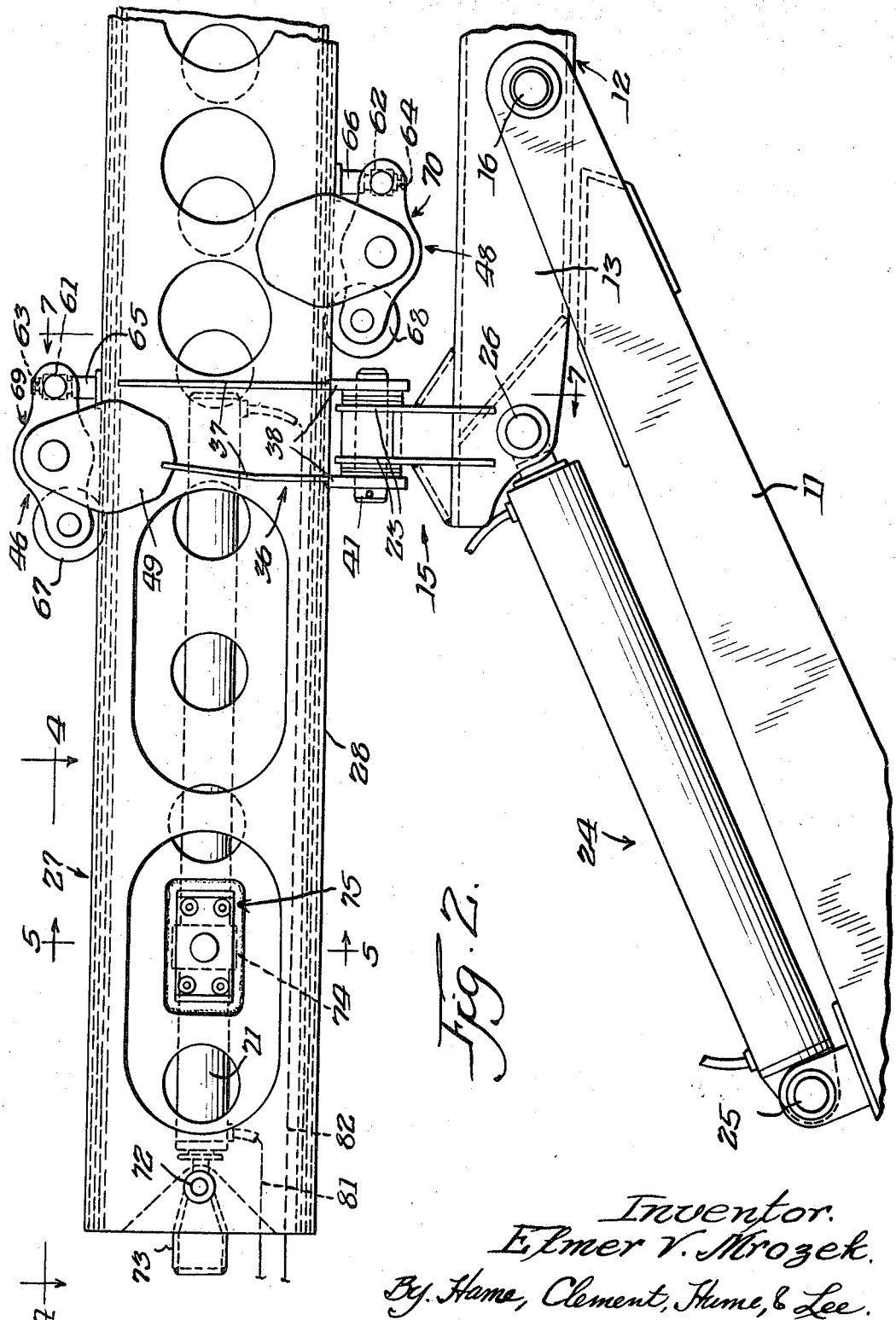

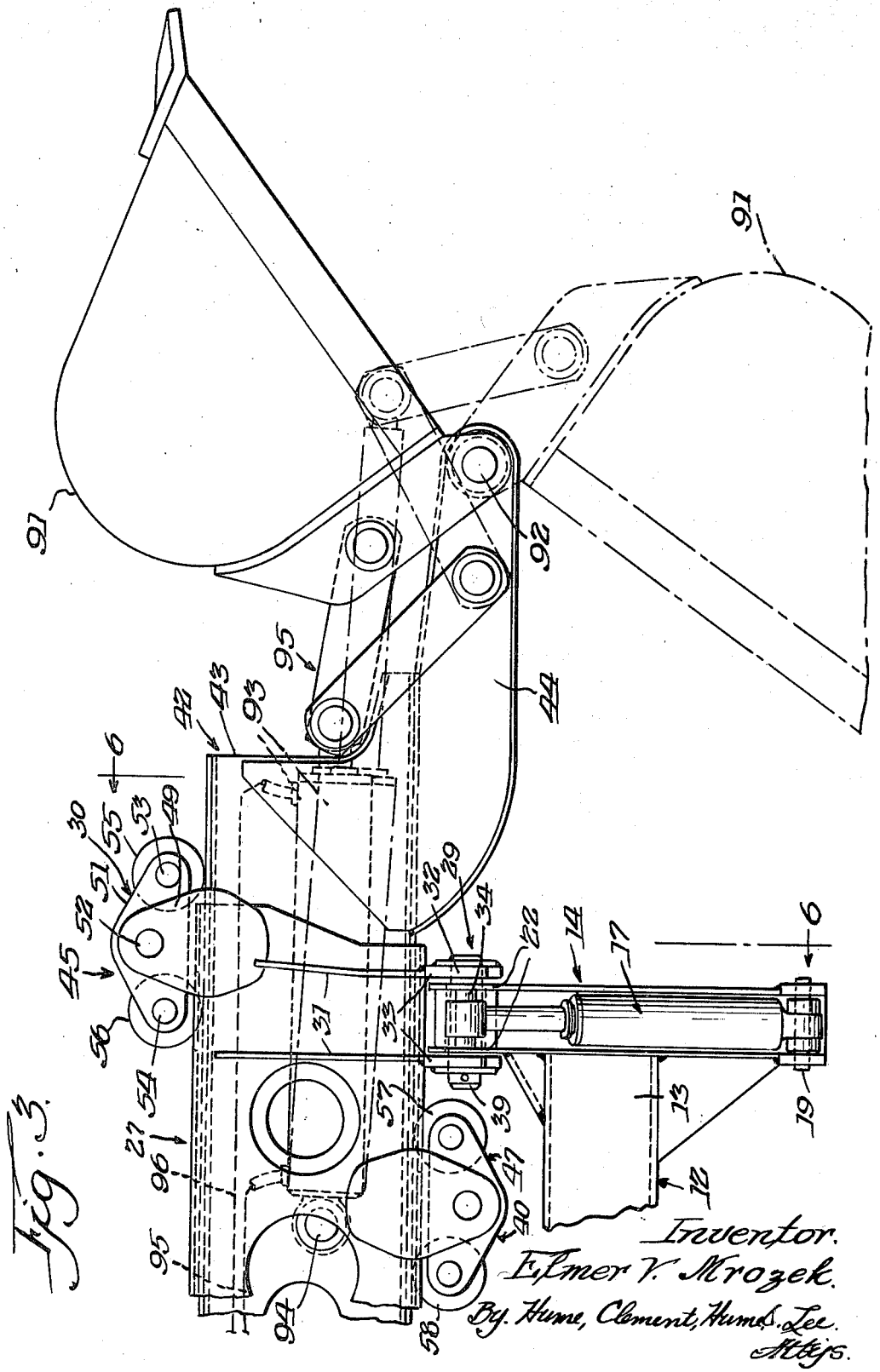

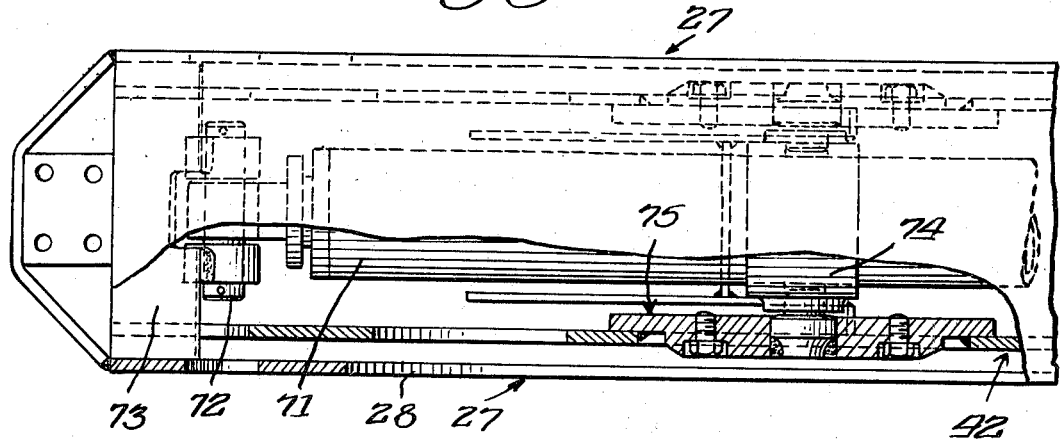
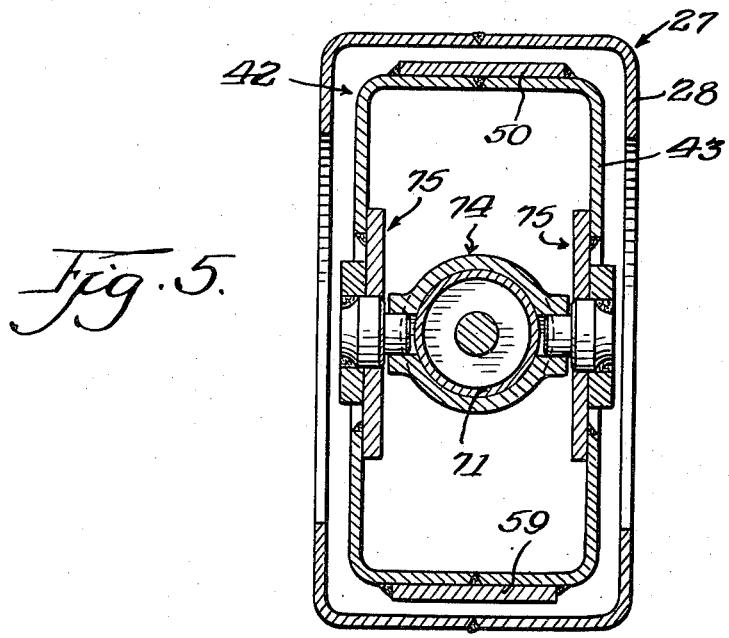

Feb. 3, 1970  E. V. MROZEK  3,493,133
DIPSTICK ASSEMBLY
Filed Nov. 15, 1967  5 Sheets-Sheet 5

Inventor.
Elmer V. Mrozek.
By Hume, Clement, Hume, & Lee
Attys.

3,493,133
DIPSTICK ASSEMBLY

Elmer V. Mrozek, Waukesha, Wis., assignor to Hydraulic Machinery Company, Inc., Butler, Wis., a corporation of Wisconsin
Filed Nov. 15, 1967, Ser. No. 683,359
Int. Cl. E02f *3/28, 3/36*
U.S. Cl. 214—138                      9 Claims

ABSTRACT OF THE DISCLOSURE

A dipstick assembly for the boom of a material handling machine. A pivot frame is mounted on the forward end of the boom for pivotal movement in a vertical plane. Power means are interconnected between the boom and the pivot frame for pivotally moving and positioning the pivot frame with respect to the boom. An elongate hollow dipstick carriage is hinged at its underside to the pivot frame for pivotal movement about a hinge axis parallel to the longitudinal axis of the dipstick carriage, enabling the dipstick carriage to be canted out of, or offset from, the vertical plane of the boom. Power means are interconnected between the pivot frame and the dipstick carriage for pivotally moving and positioning the dipstick carriage with respect to the vertical plane of the boom. An elongate hollow dipstick is slidably received within the dipstick carriage for telescopic movement with respect to the dipstick carriage. Power means are interconnected between the dipstick carriage and the dipstick for telescopically extending, retracting, and positioning the dipstick with respect to the dipstick carriage. A material handling implement is mounted on the forward end of the dipstick for pivotal movement with respect to the dipstick. Power means are interconnected between the dipstick and the material handling implement for pivotally moving the material handling element with respect to the dipstick.

---

This invention relates to material handling machines and, in particular, to a dipstick assembly for the boom of the material handling machine.

The present invention is particularly adapted for use on an earth excavating machine of the type known as a backhoe. Backhoes are usually carried by a transport means such as a truck or crawler which normally includes a turntable platform on which the backhoe is mounted to permit rotation of the backhoe about a vertical axis to facilitate working in various directions. The backhoe is provided with a boom with a dipstick pivotally carried on its forward end. The forward end of the dipstick, in turn, carries a bucket or other implement. In conventional backhoes, the dipstick is of a fixed length and is without provision for position adjustment except conventional pivotal movement in the plane of the boom. However, Mrozek Patent No. 3,129,831, issued Apr. 21, 1964, for "Dipstick Assemblies for Material Handling Equipment" discloses a dipstick assembly in which the dipstick is both longitudinally shiftable to enable advancement of the excavation cut independently of movement of the boom and rotatable about its axis to enable excavation of a trench of width greater than that of the bucket shovel without having to shift the transport machine or backhoe transversely, thereby providing an enhanced versatility of manipulation not found in prior backhoes. The present invention is an improvement over the structure disclosed in the aforementioned Mrozek Patent No. 3,129,831.

Briefly described, the dipstick assembly of the present invention comprises a pivot frame mounted on the forward end of the boom for pivotal movement in a vertical plane; power means interconnected between the boom and the pivot frame for pivotally moving and positioning the pivot frame in the vertical plane of the boom; an elongate dipstick carriage hinged at its underside to the pivot frame for pivotal movement about a hinge axis parallel to the longitudinal axis of the dipstick carriage enabling the dipstick carriage to be canted out of, or offset from, the vertical plane of the boom; power means interconnected between the pivot frame and the dipstick carriage for pivotally moving and positioning the dipstick carriage with respect to the vertical plane of the boom; an elongate dipstick slidably received within the dipstick carriage for telescopic movement with respect to the dipstick carriage; power means interconnected between the dipstick carriage and the dipstick for telescopically extending, retracting, and positioning the dipstick with respect to the dipstick carriage; a material handling implement mounted on the forward end of the dipstick for pivotal movement with respect to the dipstick; and power means interconnected between the dipstick and the material handling implement for pivotally moving the material handling implement with respect to the dipstick.

It is important to note that in the present invention a dipstick carriage is hinged at its underside to the pivot frame for pivotal movement about a hinge axis parallel to the longitudinal axis of the dipstick carriage as contrasted with the structure disclosed in the aforesaid Mrozek Patent No. 3,129,831 in which the dipstick is mounted within a pair of circular plates which, in turn, rotate in longitudinally spaced concentric bearing rings which form a portion of the pivot frame. The present hinge mounting of the dipstick carriage to the pivot frame by a gudgeon and pivot pin construction hereinafter described is less expensive and can be exposed to rather severe working and environmental conditions, such as exposure to mud and dirt, without adverse effect upon operation.

Another feature of the present invention is the provision of upper and lower roller assemblies on the dipstick carriage to serve as slide rollers for top and bottom planar surfaces, respectively of the dipstick to readily enable telescopic extension and retraction of the dipstick without the problems which attend the use of corner rollers. In the present invention, each roller assembly preferably comprises a pair of rollers mounted on opposing ends of a beam frame which is pivotally mounted on a transverse axis, thereby providing the capability for accommodating the limited angular dislocations of the axis of the dipstick relative to the axis of the dipstick carriage. The rearward lower assemblies preferably are provided with an adjustment post connected between one end of the pivotal beam frame and the dipstick carriage in lieu of a roller so that the positions of the rearward rollers are adjustable.

Both the dipstick carriage and the dipstick are hollow elongate structures, preferably of rectangular cross-sectional configuration. The power means for telescopically extending, retracting, and positioning the dipstick relative to the dipstick carriage comprises a piston and cylinder unit which is disposed substantially completely within the interior of the dipstick carriage co-longitudinally therewith. By enclosing the piston and cylinder unit within the dipstick carriage, damage to the piston and cylinder unit due to contact with the excavation, the earth removal truck, or similar contact is prevented. Similarly, damage to the fluid conduits leading to the piston and cylinder unit, particularly at the point of seal connection with the piston and cylinder unit, is prevented. Protection is similarly provided for the power means for operating the implement mounted at the forward end of the dipstick which is also a piston and cylinder unit with at least the cylinder portion disposed substantially completely within the interior of the dipstick.

These and other features and objects of the present invention will be better understood by reference to the following detailed description taken in conjunction with the accompanying drawings.

In the drawings:

FIGURE 2 is an enlarged side elevational view of the rearward portion of the dipstick assembly of the present invention.

FIGURE 3 is an enlarged side elevational view of the forward portion of the dipstick assembly of the present invention.

FIGURE 4 is a top elevational view with a portion broken away as taken at 4—4 of FIGURE 2.

FIGURE 5 is an enlarged cross-sectional view taken at 5—5 of FIGURE 2.

Figure 1:
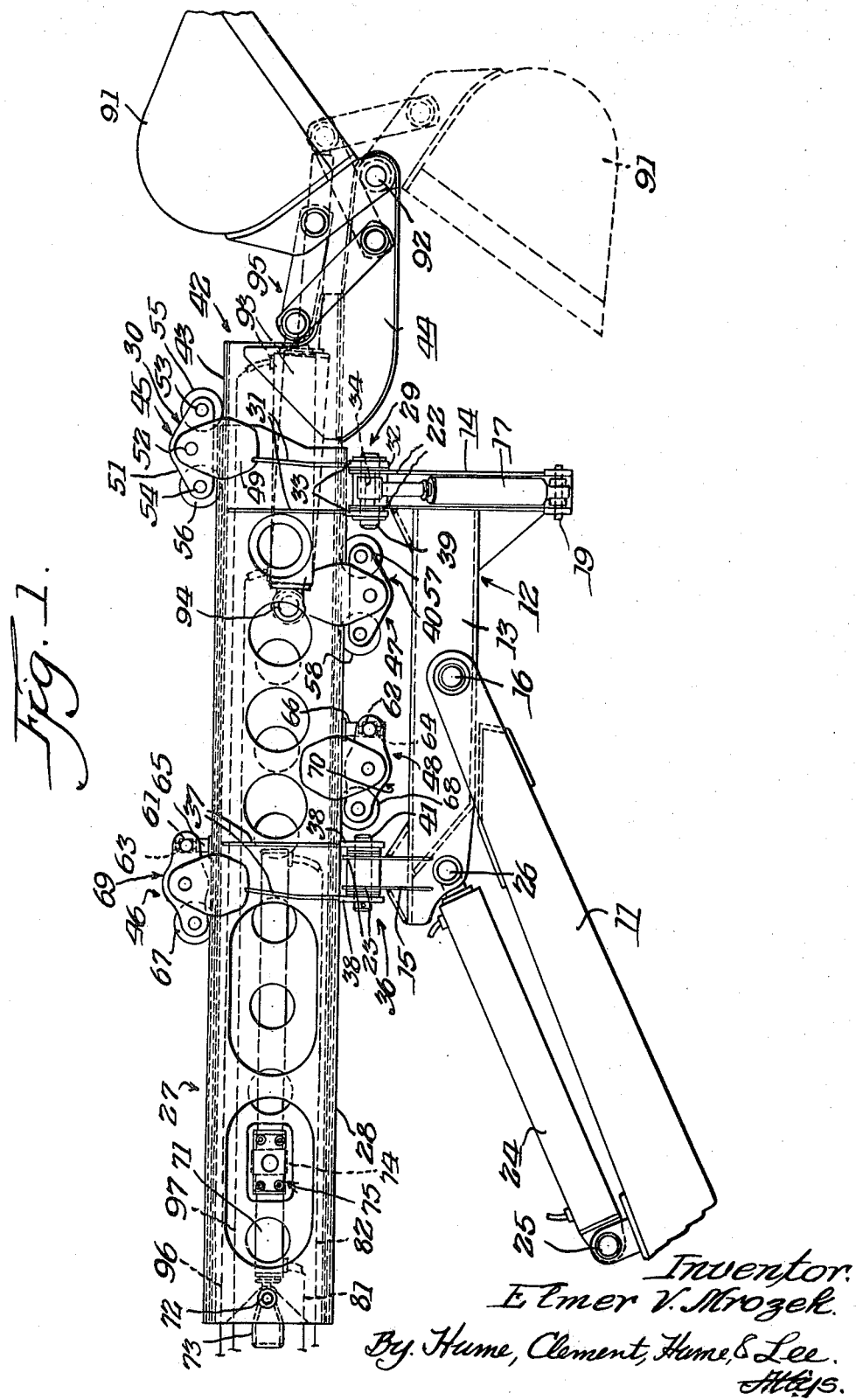
FIGURE 1 is a side elevational view of the dipstick assembly of the present invention mounted on the forward end of the boom.

Referring now to FIGURE 1, the dipstick assembly of the present invention is shown mounted on the forward end of a conventional backhoe boom 11. Only the forward portion of the boom 11 is included in FIGURE 1 in order that the complete dipstick assembly of the present invention be shown in sufficient scale for clarity. The remainder of the boom 11 and other portions of the backhoe not shown are conventional in structure, such as shown in the aforementioned Mrozek Patent No. 3,129,-831.

Figure 6:
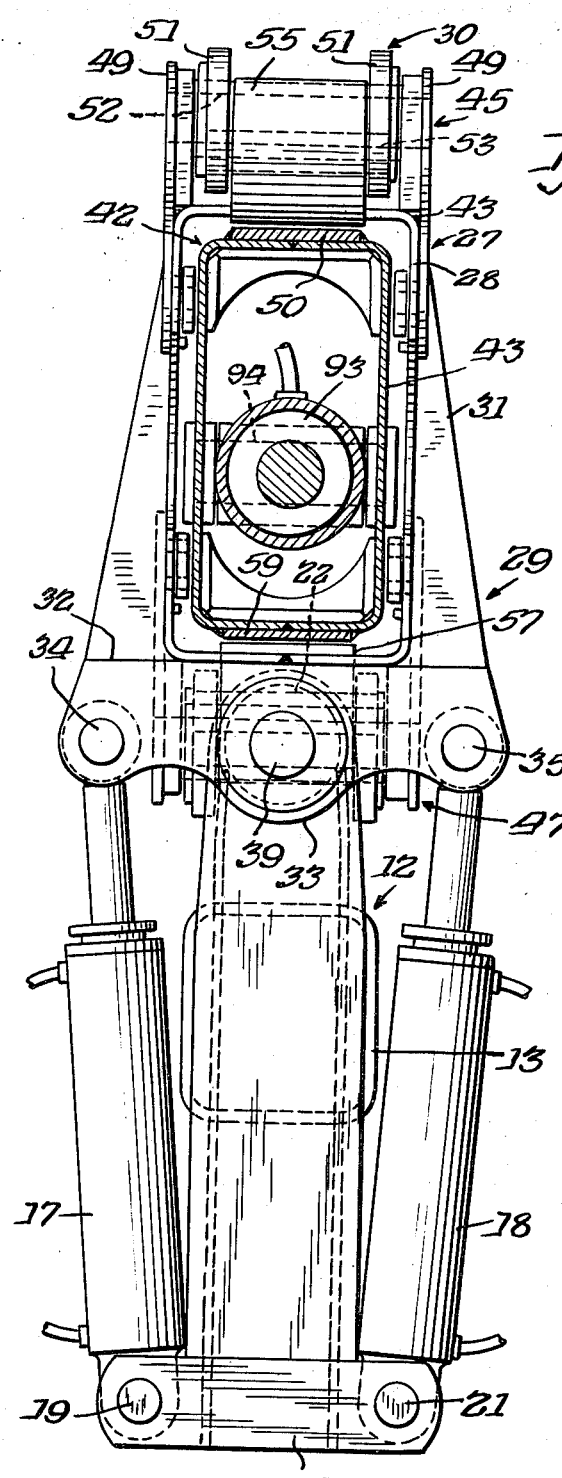
FIGURE 6 is an enlarged cross-sectional view taken at 6—6 of FIGURE 3.

A pivot frame 12, comprising a strut 13, a forward framework 14, and a rearward framework 15, is pivotally mounted on the forward end of the boom 11. Specifically, the strut 13 is carried on a pivot pin 16 intermediate its ends. The pivot pin 16 is passed through the forward end of the boom 11 and the strut 13. The forward end of the boom 11 is bifurcated to accommodate the strut 13. The forward framework 14 is rigidly welded to the forward end of the strut 13. As best illustrated in FIGURE 6, a pair of piston and cylinder assemblies 17 and 18 are pivotally mounted at one end by pivot pins 19 and 21, respectively, to the lowermost portion of the forward framework 14 for canting the dipstick carriage as will be described hereinafter. The top portion of the forward framework 14 is formed to provide a pair of gudgeons 22. The rearward framework 15 of the pivot frame is rigidly welded to the strut 13 and is also formed at its upper portion to provide a pair of gudgeons 23 which are coaxially aligned with gudgeons 22. In order to effect pivotal movement and positioning of the pivot frame 12 with respect to the boom 11 in a vertical plane, a hydraulic piston and cylinder unit 24 is interconnected between the boom 11 and the pivot frame 12. One end of the piston and cylinder unit 24 is pivotally secured to an intermediate portion of the boom 11 by pivot pin 25. The opposite end of the piston and cylinder unit 24 is pivotally secured to the rearward end of the strut 13 of the pivot frame 12 by a pivot pin 26.

Figure 7:
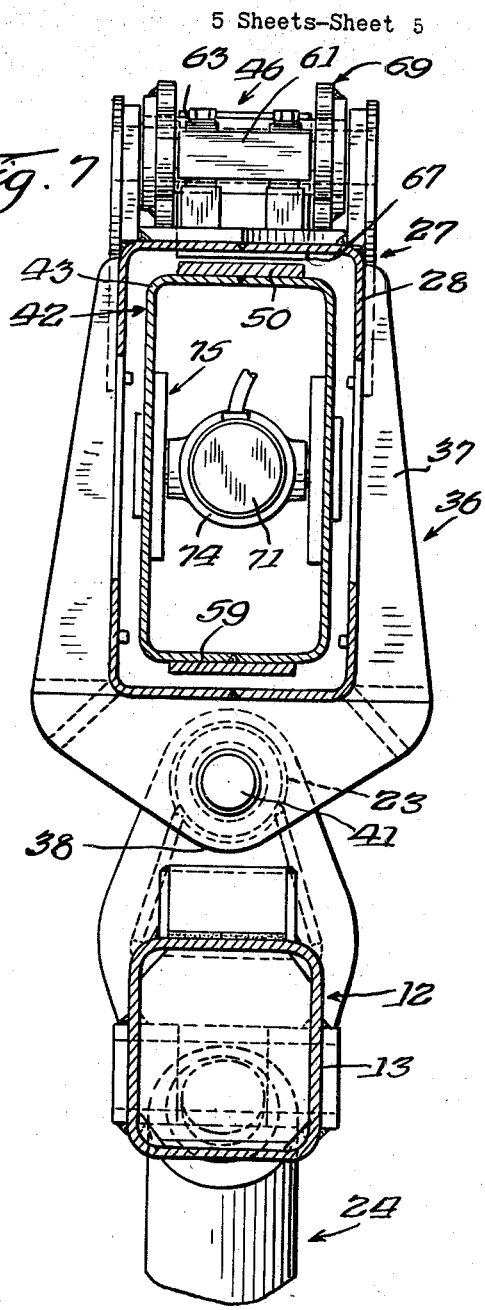
FIGURE 7 is an enlarged cross-sectional view taken at 7—7 of FIGURE 2.

In the present invention as elongate dipstick carriage 27 is hinged at its underside to the pivot frame for pivotal movement about a hinge axis parallel to the longitudinal axis of the dipstick carriage. As best illustrated in FIGURES 5, 6, and 7, the dipstick carriage 27 comprises an elongate hollow structural member 28 of a cross-sectional configuration illustrated in FIGURES 5 through 7. The elongate member 28 may be provided with side openings for weight saving and manual and visual access purposes. Near its forward end, the dipstick carriage includes a forward support framework or yoke 29 formed by a pair of webs 31 which are rigidly welded to the member 28 and which are formed at their lower portions to provide a pair of crosspieces 32. The crosspieces 32, in turn, are formed to define a pair of gudgeons 33 centrally disposed below the lower surface of the member 28. The crosspieces 32 project laterally of the member 28 on each side thereof for pivotal connection to the piston ends of the piston and cylinder units 17 and 18 by pivot pins 34 and 35, respectively. The dipstick carriage 27 further includes a second support framework or yoke 36 consisting of a pair of webs 37 welded to the member 28 intermediate the ends thereof and formed at their lower portion to provide a pair of gudgeons 38 which are coaxially aligned with the gudgeons 33. A pivot pin 39 is passed through the gudgeons 23 of the forward framework of the pivot frame and the gudgeons 38 of the forward support framework of the dipstick carriage to form a first hinge attaching the dipstick carriage 27 to the pivot frame 12. Another pivot pin 41 is passed through the gudgeons 22 of the rearward framework of the pivot frame and the gudgeons 33 of the second support framework of the dipstick carriage, thereby forming a second hinge attaching the dipstick carriage 27 to the pivot frame 12. By cooperatively actuating the piston and cylinder units 17 and 18, the dipstick carriage 27 can be pivotally moved and positioned with respect to the pivot frame 12 about a hinge axis parallel to the longitudinal axis of the dipstick carriage 27, thereby enabling the dipstick carriage to be canted out of, or offset from, the vertical plane of the boom.

An elongate dipstick 42 is slidably received within the dipstick carriage 27 for telescopic movement with respect to the dipstick carriage. The dipstick 42 comprises an elongate hollow structural member 43 of a rectangular cross-sectional configuration as illustrated in FIGURES 5 through 7 of smaller cross-sectional height and width dimensions than the member 28 of the dipstick carriage 27. The member 43 is preferably of greater length than the dipstick carriage member 28 and has an implement attachment framework 44 rigidly welded to the forward end thereof.

In order to facilitate telescopic extension and retraction of the dipstick 42 with respect to the dipstick carriage 27, the dipstick carriage 27 is provided with a top pair of roller assemblies 45 and 46 and a bottom pair of roller assemblies 47 and 48. Considering first the forward top roller assembly 45 best illustrated in FIGURES 3 and 6, it comprises a pair of side plates 49 rigidly affixed to the sides of the dipstick carriage structural member 28 and projecting above the top of the member 28. Two beam members 51 are disposed each interiorly adjacent one of the side plates 49 intermediate their ends on a pivot pin 52 which extends through both of the side plates 49. At their outer ends, the two beam members 51 are joined by a pair of pins 53 and 54 on which are rotatably mounted carriage rollers 55 and 56, respectively. The rollers 55 and 56 are positioned to engage a roller plate 50 which is welded to the top of the dipstick structural member 43 preferably for the complete length thereof. A suitable opening is provided in the top surface of the dipstick structural member 28 to accommodate the roller 55. In short, the roller assembly 45 provides a pair of rollers 55 and 56 rotatably mounted on axes parallel to the top planar surface of the dipstick structural member 43 on the outer ends of a balance beam frame 30 which is formed by the members 51 and pins 53 and 54 and which is pivotally mounted intermediate its ends about an axis also parallel to the top planar surface of the dipstick structural member 43.

The bottom forward roller assembly 47 is identical in construction to the top roller assembly 45 just described except that it is in an inverted position with its rollers 57 and 58 adapted to bear against a bottom roller plate 59 welded to the bottom surface of the dipstick structural member 43 preferably along the complete length of the member 43. Suitable openings are provided in the bottom surface of the dipstick carriage structural member 28 to accommodate the rollers 57 and 58. In short, the bottom forward roller assembly 47 comprises a pair of rollers 57 and 58 rotatably mounted at the opposite ends of a balance beam frame 40 for rotation about axes parallel to the bottom planar surface of the dipstick structural member 43, the balance beam frame 40 itself being pivotally mounted intermediate its ends about an axis also parallel to the bottom planar surface of the dipstick structural member 43.

The second top roller assembly 46 and the second bottom roller assembly 48, best shown in FIGURES 2, 4, and 6, are identical in construction to the respective top and bottom forward roller assemblies 45 and 47, respectively, with the exception that, in lieu of rollers, the forward ends of the balance beam frames 69 and 70 of the respective roller assemblies 46 and 48 carry adjsutment blocks 61 and 62, journaled in the forward ends of the respective balance beam frames. Threaded through the adjustment beam blocks 61 and 62 are upstanding threaded shafts 63 and 64, respectively. The threaded shafts 63 and 64 are carried by standards 65 and 66 which are rigidly secured to the top and bottom surfaces, respectively, of the dipstick carriage structural member 28. The threaded shafts 63 and 64 are mounted in their respective standards 65 and 66 so as to be rotatable about their axes. By rotation of the threaded shafts 63 and 64, the position of the associated rollers 67 and 68 at the opposite ends of the beam frame can be adjusted to facilitate alignment and realignment of the dipstick 42 within the dipstick carriage 27.

The power means for telescopically extending, retracting, and positioning the dipstick 42 relative to the dipstick carriage 27 comprises a hydraulic piston and cylinder unit 71. The piston end of the piston and cylinder unit 71 is pivotally secured to a pivot pin 72 which, in turn, is journaled in an anchor frame 73 rigidly affixed to the rearward end of the dipstick carriage structural member 28. The cylinder portion of the piston and cylinder unit 71 is provided with a support collar 74 encircling the cylinder portion intermediate its ends. The support collar 74 is journaled on a pair of trunnion frames 75 which, in turn, are rigidly affixed to opposite sides of the dipstick structural member 43, as best illustrated in FIGURE 5. Thus, the piston and cylinder unit 71 is substantially completely disposed within the interior of the dipstick carriage 27 in co-longitudinal orientation therewith. The piston and cylinder unit 71, together with its hydraulic lines 81 and 82 (shown diagrammatically) are protected against possible damaging contact with the excavation or adjacent structures or vehicles. The hydraulic lines 81 and 82 are preferably carried within a suitable telescoping conduit (not shown). Moreover, by pivotally mounting the piston end of the piston and cylinder unit 71 to the anchor frame 73 and pivotally mounting the cylinder portion to the trunnion frames 75, limited angular disorientation of the dipstick 42 with respect to the dipstick carriage 27 can be accommodated without impeding the functioning of the piston and cylinder unit 71.

The forward end of the dipstick 42 is provided with power means for pivotally moving a material handling implement carried on the forward end of the dipstick. In the present example, an excavating bucket 91 is shown pivotally mounted at pivot point 92 to the frame 44. Obviously, other forms of material handling implements may also be employed. The power means for moving the implement comprises a piston and cylinder unit 93. The piston portion of the piston and cylinder unit 93 is substantially completely disposed within the interior of the dipstick structural member 43. At its rearward end, the cylinder portion of the piston and cylinder unit 93 is pivotally attached to the dipstick structural member 43 by pivot pin 94. The piston rod end of the piston and cylinder unit 93 is connected to the bucket 91 through a conventional linkage 95. Actuation of the piston and cylinder unit 93 enables selective pivotal movement and positioning of the bucket 91 between a first limit position shown in elevation and a second limit position shown in phantom view in FIGURE 3. By disposing the cylinder portion of the piston and cylinder unit 93 within the interior of the dipstick structural member 43 together with its hydraulic lines 96 and 97, protection is provided for the more vulnerable portions of the piston and cylinder unit 93 from damaging contact with the excavation or adjacent structures or vehicles. The hydraulic lines 96 and 97 are shown diagrammatically and are preferably enclosed within a telescoping conduit (not shown), so as to extend through the dipstick and the dipstick carriage out the rearward end of the dipstick carriage.

It is to be understood that suitable and conventional control means will be provided in the backhoe cab for selectively actuating the several piston and cylinder units 17, 18, 24, 71, and 93.

Typical operation of the dipstick assembly is as follows. In the excavation of a trench by a backhoe provided with the dipstick assembly of the present invention, the vehicle carrying the backhoe is initially positioned at an appropriate location at the excavation site. The boom 11 is positioned, and the bucket 91 is brought into engagement with the earth. The piston and cylinder unit 24 is then actuated to swing the bucket 91 and the dipstick 43 in a vertical plane about the pivot 16 to initiate excavation. The excavating position of the bucket 91 is determined by the piston and cylinder unit 93 which is also actuated for dumping the bucket 91. During the excavation operation, there may be instances when the boom 11 has been lowered or raised to a limit position, and it is desired to extend the reach of the dipstick even further. In this event, the operator actuates the cylinder unit 71 to extend the dipstick to a desired length. Shifting the dipstick 43 within the dipstick carriage 27 by means of the piston and cylinder unit 71 also enables the earth adjacent the backhoe to be undercut without the necessity of moving the backhoe itself. Further, in the event a trench is to be excavated which is of desired width greater than the width of bucket 91, the backhoe may be swung on its turntable after making the initial cuts. By actuating piston and cylinder units 17 and 18, the dipstick carriage is canted out of, or offset from, the vertical plane of the boom so that the sides of the bucket can then be brought into parallel relationship with the sides of the trench to enable widening of the trench without moving the backhoe transport vehicle itself transversely of the trench. Actuation of the piston and cylinder units 17 and 18 can also be used to effect hinged movement of the dipstick about the pivot pins 39 and 41 to move the bucket around an obstruction.

Although a preferred embodiment of the present invention has been shown and described, it is to be understood that this is by way of example and not by way of limitation. It is contemplated that modifications may be made within the scope of the claims without departing from the spirit of the invention.

The invention claimed is:

1. A dipstick assembly for the boom of a material handling machine, said dipstick assembly comprising:

a pivot frame mounted on the forward end of said boom for pivotal movement in a vertical plane;

power means interconnected between said boom and said pivot frame for pivotally moving and positioning said pivot frame with respect to said boom;

an elongate dipstick carriage hinged at its underside to said pivot frame for pivotal movement about a hinge axis parallel to the longitudinal axis of said dipstick carriage, thereby enabling the dipstick carriage to be canted out of the vertical plane of the boom;

power means interconnected between said pivot frame and said dipstick carriage for pivotally moving and positioning said dipstick carriage with respect to said pivot frame;

an elongate dipstick slidably received within said dipstick carriage for telescopic movement with respect to said dipstick carriage; and power means interconnected between said dipstick carriage and said dipstick for telescopically extending, retracting, and positioning said dipstick with respect to said dipstick carriage.

2. A dipstick assembly for the boom of a material handling machine, said dipstick assembly comprising:

pivot frame means mounted on the forward end of said boom for pivotal movement in a vertical plane;

power means interconnected between said boom and said pivot frame means for pivotally moving and positioning said pivot frame means with respect to said boom in a vertical plane;

elongate hollow dipstick carriage means hinged to said pivot frame means for pivotal movement about a hinge axis parallel to the longitudinal axis of said dipstick carriage means, thereby enabling the dipstick carriage to be canted out of the vertical plane of the boom;

power means interconnected between said pivot frame means and said dipstick carriage means for pivotally moving and positioning said dipstick carriage means with respect to the vertical plane of the boom;

an elongate hollow dipstick slidably received within said dipstick carriage means for telescopic movement with respect to said dipstick carriage means;

power means interconnected between said dipstick carriage and said dipstick for telescopically extending, retracting, and positioning said dipstick with respect to said dipstick carriage;

a material handling implement mounted on the forward end of said dipstick for pivotal movement with respect to said dipstick; and power means interconnected between said dipstick and said material handling implement for pivotally moving said material handling implement with respect to said dipstick.

3. The dipstick assembly defined in claim 2 wherein said dipstick carriage and said dipstick are each rectangular in cross-section.

4. The dipstick assembly defined in claim 2 wherein said power means for telescopically moving said dipstick with respect to said dipstick carriage is a piston and cylinder unit disposed substantially completely within the interior of said dipstick carriage and co-longitudinally therewith.

5. The dipstick assembly defined in claim 2 wherein said power means for pivotally moving said material handling implement comprises a piston and cylinder unit, at least the cylinder portion of which is disposed substantially completely within the interior of said dipstick.

6. The dipstick assembly defined in claim 2 wherein said dipstick carriage includes a bottom plurality of roller assemblies serving as slide bearings for a bottom surface of said dipstick and a top plurality of roller assemblies serving as slide rollers for a top planar surface of said dipstick.

7. The dipstick assembly defined in claim 6 wherein said bottom plurality of roller assemblies comprises:

a forward roller assembly including a beam frame pivotally mounted about a transverse axis and a pair of transversely-oriented rollers rotatably mounted on said beam frame, one on each side of said transverse axis; and a rearward roller assembly including a beam frame pivotally mounted about a transverse axis, a roller rotatably mounted on said beam frame rearwardly of said transverse axis, and adjustment means interconnected between said dipstick carriage and the forward portion of said beam frame for pivotally positioning said roller.

8. The dipstick assembly defined in claim 6 wherein said top plurality of roller assemblies comprises:

a forward roller assembly including a beam frame pivotally mounted about a transverse axis and a pair of transversely-oriented rollers rotatably mounted on said beam frame, one on each side of said transverse axis; and a rearward roller assembly including a beam frame pivotally mounted about a transverse axis, a roller rotatably mounted on said beam frame rearwardly of said transverse axis, and adjustment means interconnected between said dipstick carriage and the forward portion of said beam frame for pivotally positioning said roller.

9. A dipstick assembly for the boom of a material handling machine, said dipstick assembly comprising:

a pivot frame mounted on the forward end of said boom for pivotal movement in a vertical plane;

power means interconnected between said boom and said pivot frame for pivotally moving and positioning said pivot frame with respect to said boom;

an elongate dipstick carriage;

a forward support frame mounted on the underside of said dipstick carriage near the forward end thereof, said forward support frame having side portions projecting laterally of said dipstick carriage and a central portion defining a pair of gudgeons;

a rearward support frame mounted on the underside of said dipstick carriage having a central portion defining a pair of gudgeons;

a pair of pivot pins, one pivot pin hinging said gudgeons of said forward support frame of said dipstick carriage to said forward gudgeons of said pivot frame and the other pivot pin hinging the gudgeons of said rearward support frame to the rearward gudgeons of said pivot frame such that said dipstick carriage is hinged to said pivot frame for pivotal movement about a hinge axis parallel to the longitudinal axis of said dipstick carriage;

a piston and cylinder unit interconnected between said pivot frame and each of said laterally projecting portions of said forward support frame for cooperatively pivotally moving and positioning said dipstick carriage with respect to said pivot frame on said pair of pivot pins;

an elongate dipstick slidably received within said dipstick carriage for telescopic movement with respect to said dipstick carriage;

power means interconnected between said dipstick carriage and said dipstick for telescopically extending, retracting, and positioning said dipstick with respect to said dipstick carriage;

a material handling implement mounted on the forward end of said dipstick for pivotal movement with respect to said dipstick; and power means interconnected between said dipstick and said material handling implement for pivotally moving said material handling implement with respect to said dipstick.

References Cited

UNITED STATES PATENTS

| | | | |
|---|---|---|---|
| 3,087,636 | 4/1963 | Weaver | 214—141 |
| 3,129,831 | 4/1964 | Mrozek | 214—137 |
| 3,140,000 | 7/1964 | Pilch | 214—138 |
| 3,341,029 | 9/1967 | Barkley et al. | 212—155 |

HUGO O. SCHULZ, Primary Examiner

U.S. Cl. X.R.

214—141